Figure 1:
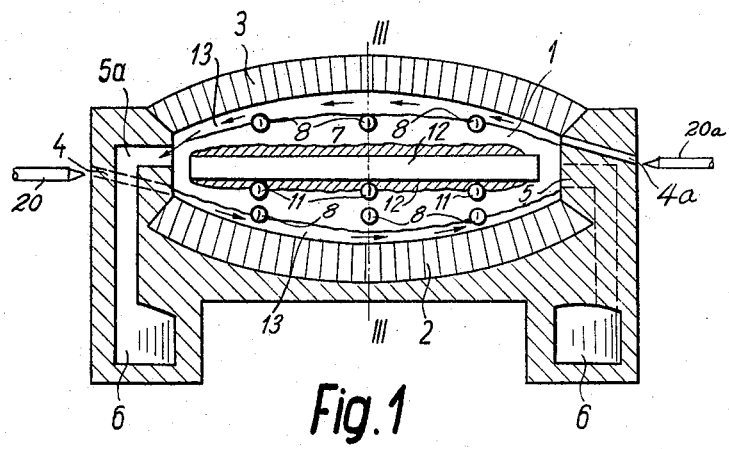

United States Patent Office 3,279,774
Patented Oct. 18, 1966

3,279,774
ANNEALING FURNACE
Attila Biro, Miskolc, Hungary, assignor to Nikex Nehezipari Kulkereskedelmi Vallalat, Budapest, Hungary
Filed May 29, 1963, Ser. No. 284,171
4 Claims. (Cl. 263—6)

The invention concerns a pusher type furnace for the heating of metals and steels in which the metal and steel bodies to be heated are maintained in a current of protective gas extending in the longitudinal direction of the furnace, and the complete enveloping action of the layer of protective gas is ensured in that the flow of the heating gases or their combustion products takes place around the envelope of protective gas.

In known constructions of pusher type furnaces, the reducing and, to a small extent oxidising, layer of protective gas surrounding the metal or steel bodies to be heated is maintained by blowing the protective gas into the furnace in the direction of the longitudinal axis of the furnace, whilst the quantity of air which supplies the oxygen required for the combustion of the gases, is likewise blown in the direction of the longitudinal axis or at an acute angle thereto. The envelope of protective gas which is to protect the metals or steels to be annealed is subjected, by the action of the air flowing in the same direction, to interruptions and mixing. The metal or steel surfaces come into contact with the oxygen in the air and surface oxidation and scale formation results.

Under the circumstances as described, there results furthermore a relatively slow mixing of the reducing gas layer with the air flowing in, as a result of which the envelope of protective gas is cooled and also the temperature of the surface of the glowing metals or steel becomes lower than desirable, i.e. the annealing process becomes less effective.

The heating capacity of the combustion gases can only be given off to the surface of the metals or steels to be annealed through the intermediary of the relatively cold layer of protective gas and the efficiency of the heat transfer is thus rather low. Under the action of the flow of air, the wall surfaces of the furnaces are already cooled at the start of the flow paths of the gas and only a weak heat radiation for heating the metal or steel surfaces is exerted by the wall surfaces. Starting from the end of a furnace, into which heating gases and air are blown, the wall surface undergoes such a rapid cooling that at the outlet of the pusher type furnace a low temperature of about 800° instead of the initial temperature of 1350° C. prevails.

Similar conditions also result if steps are provided along the surface and the necessary quantity of air is fed to the various side surfaces of the individual steps.

Cases occur in which scale formation in the pusher type furnace can be tolerated during the soaking. In such cases, the scale or the slag deposited on the bottom of the surface is removed from time to time, e.g. once every six months, in a dry operation, which, however, generally leads to damage or destruction of the smooth bottom of the furnace.

It is the object of the present invention to provide an improved pusher type furnace for the soaking of metal or steel bodies, in which the layer of protective gas flowing in the longitudinal direction of the furnace is protected from the disturbing, interrupting, cooling and vortex-forming action of the inflowing gas or air, and in which at the same time an improved degree of efficiency and a higher output of the furnace can be achieved by a correct adjustment of the combination process and by keeping the temperature uniform along the whole wall surface, and in which, furthermore, the slag always remains in the liquid condition on the bottom of the furnace, from where it is removed without any damage to the bottom.

Figure 2:
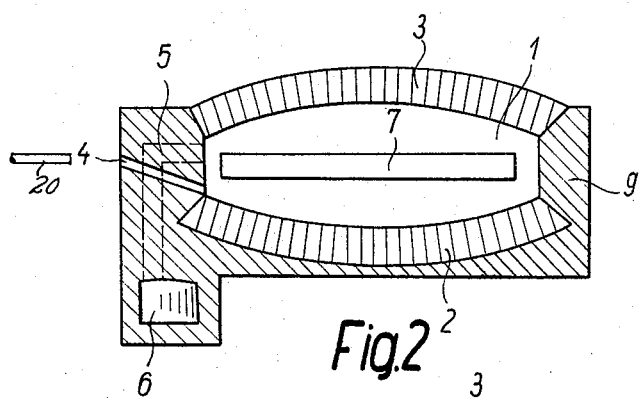
Figure 3:
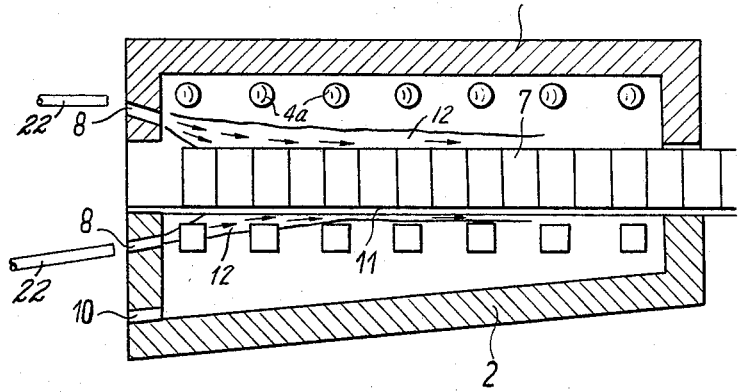

A more detailed description of the invention will now follow with reference to some embodiments by way of example, shown in the accompanying drawings, in which:

FIGURE 1 shows a diagrammatic cross section through a furnace for the annealing of long metal or steel pieces, FIGURE 2 is a cross section of a furnace for the annealing of short metal or steel pieces, and FIGURE 3 is a longitudinal section taken along the line III—III of FIGURE 1.

The heating chamber 1 of the furnace is bounded at the top and bottom by an elliptical arched bottom 2 and arched roof 3 respectively, e.g. of magnesite bricks. The side walls between the arches 2 and 3 are preferably made of silicious bricks.

The heating gases 13, derived from burners 20 and 20a, enter the heating chamber 1 through the inlet tubes 4 and 4a, the axes of which extend tangentially to the respective inner surfaces of the bottom 2 and roof 3, and are built into the side walls of the pusher type furnace. Inlets 4 and 4a are uniformly spaced along the length of the furnace in the side walls. The flow of the heating gases entering through the inlets 4 and 4a and of the resulting flue gases follows the internal surface of the bottom 2 and roof 3. The combustion products leave the heating chamber and pass to the flue gas conduits 6 through openings 5 and 5a which are disposed opposite the inlets 4 and 4a, in the other side wall.

In this manner, the arched bottom and roof surfaces 2 and 3 are uniformly heated by the heat of combustion of the heating gases flowing through the inlets 4 and 4a. By regulating the quantities of gas flowing through the inlets 4 and 4a, the temperature distribution along the length of the furnace can be adjusted as desired. The complete combustion of the gases and the regulated temperature distribution have the effect that the wall surface temperature in the vicinity of the outlets is not lower, but can even be higher than the temperature in the vicinity of the inlets.

In the pusher type furnace according to the invention, there are provided on the end wall which is intended as the exit side for the movement of the work pieces, apertures 8 for introducing the protective gases 12, derived from sources 22 (FIG. 3), and the axes of apertures 8 make an acute angle of a few degrees with the longitudinal axis of the furnace. The protective gases 12 flow along the bodies intended to be soaked enveloping them, in the direction of the longitudinal axis of the furnace. The envelope of protective gas 12 does not come into contact either with the air or with the heating gases 13, and therefore no vortices are formed. The envelope of protective gas 12 enveloping the bodies, fills up the dead space which is formed by the heating gases 13 which flow in through the inlets 4 and 4a and circulate along and around the wall surface. The protective envelope does not cool the walls, the surfaces of the metal bodies do not come into contact with oxygen and no scale is formed.

The furnace according to the invention can be used in such a manner that in the side walls, at a certain distance in front of the exit for the metal bodies, horizontal openings are provided, through which a suitable quantity of additional air is allowed to flow into the heating chamber 1 so as to blow away the enevelope of protective gas which remains unburnt. The quantity of gas of the envelope of combustion gas thus blown off is mixed with the air burned and thus increases the economic efficiency of the furnace.

These additional air-conducting openings are fitted preferably in that portion of the furnace, in which the temperature of the heated metal or steel bodies is below 700° C., i.e. lower than the lower temperature limit for oxidation.

The embodiment according to FIGURE 2 is essentially similar to the construction according to FIGURE 1 but more suitable for the annealing of shorter pieces. In the embodiment according to FIGURE 2, the inlets 4 and outlets 5 are fitted in only one side wall, the other side wall remaining free. With this construction, it is advantageous to construct the inlets 4 for the heating gases in only one row having their axes extending tangentially to the bottom surface. The heating gases flowing in here follow the line of flow along the inner bottom surface 2, the other side wall 9 and the inner arched roof surface 3, almost corresponding to a complete ellipse, the outlets 5 in the same side wall above the inlets 4 conveying the flue gases to the single flue discharge passage.

In the construction according to FIGURE 2, the feed and flow of the protective gases, the combustion processes, the course of the heat transfer and the conditions of glowing of the work are the same as in the construction of furnace according to FIGURE 1.

To make the pusher type furnace more versatile or to broaden its possibilities of use, the bottom surface 2 is constructed preferably with a slight incline of 10–15°. An aperture 10 is provided at the lowermost point of this surface 2 in the rear end wall of the heating chamber.

In annealing processes, in which scale formation is admissible, the scale formed on the surface of the metal or steel pieces sliding on rails 11, drops down and is converted into the liquid state by being melted on the bottom surface 2. This liquid state is maintained during the whole annealing process and the scale can be continuously drawn off through the aperture 10 even during the soaking process.

The furnace according to the invention has the following advantages:

Due to the linear movement of the protective gas atmosphere, the metal or steel pieces to be annealed continuously obtain an absolutely sure protective envelope, and the possibility of the formation of scale by the inflow of oxygen is prevented from the start. The envelope of protective gas which surrounds the bodies to be annealed does not come into contact with either cold air or cold heating gases, and thus does not exert any cooling effect on the glowing body surfaces. The wall of the furnace is not contacted by protective gases or air currents at low temperature, i.e. the whole wall surface participates in the heat exchange as a result of which the economy and productivity of the furnace is greatly increased.

When using the pusher type furnace according to the invention, a considerably more extensive heat transfer is achieved along the whole length of the wall, and it is much easier to control and exactly to adjust the temperature distribution and also the heat radiation than with the hitherto known constructions. Especially in the heating of low alloy types of steel, an increased production is thus achieved which could not be effected with the hitherto known types of furnaces.

Finally also the protective gas is burnt out in the heating chamber, so that the degree of efficiency of the heating is improved.

With the aid of the pusher type furnace according to the invention, a simpler structure with a larger furnace output and capacity can be achieved with the same bottom surface than with known processes and constructions, as a result of which both the specific consumption of heating gas, as well as the costs of production are considerably lowered.

The basin-like shape of the bottom symmetrical to the roof allows a more uniform heating and annealing of the metal or steel bodies and the inclined bottom surface makes it possible to maintain the mass of slag, when scale formation is admissible, in a liquid condition and to let it flow off continuously during the annealing process. Since an untimely dry removal of slag does not occur at all, the usefulness of the furnace is improved and its life prolonged.

The invention is not limited to the features described by way of example or to the components of the furnace as illustrated. A modification of the features or a substitution of the components of the furnace by others having the same effect, does not affect the scope of protection of the invention.

What I claim is:

1. In an annealing furnace having moving means for moving workpieces which are adapted to be pushed along a predetermined path extending longitudinally of the furnace from an entrance end to an exit end thereof where said furnace is provided with an exit end wall formed with a work opening, said furnace having arched top and bottom walls provided with concave surfaces directed toward the interior of the furnace and providing the furnace in its interior with a substantially elliptical cross-section, said furnace having opposed side walls at least one of which is formed with a plurality of inlet openings distributed longitudinally along the furnace and extending tangentially with respect to the inner surface of one of said walls for directing heating gases into said furnace, burner means for burning said heating gases, and at least one of said side walls of said furnace being formed with outlet openings also distributed longitudinally along said furnace and communicating with the interior thereof, said furnace having a flue gas conduit with which said outlet openings communicate, and said furnace being formed at said exit end wall thereof with a plurality of openings inclined toward said path along which the workpieces move and through which a protective gas is introduced into said furnace, and a protective gas source communicating with said inclined openings of said exit end wall.

2. In an annealing furnace as recited in claim 1, both of said side walls being formed with inlet and outlet openings, and said inlet openings of one of said side walls extending tangentially with respect to the inner surface of said bottom wall while said inlet openings of the other of said side walls extend tangentially with respect to the inner surface of said top wall.

3. In a furnace as recited in claim 1, said bottom wall of said furnace being inclined downwardly from said entrance towards said exit end wall thereof, and said exit end of said furnace being formed with an aperture through which scale in liquid form deposited on said bottom wall can flow out of said furnace.

4. In a furnace as recited in claim 1, both of said side walls of said furnace being formed with outlet openings and with flue gas conduits with which said outlet openings communicate and both of said side walls also being formed with said inlet openings distributed longitudinally of said furnace with the inlet openings in one of said side walls extending tangentially with respect to the inner surface of said bottom wall and the inlet openings in the other of said side walls extending tangentially with respect to the inner surface of said top wall, said openings at said exit end through which protective gas is introduced being situated above and below the path of movement of the workpieces and said bottom wall being inclined downwardly from said entrance to said exit end of said furnace and said exit end wall of said furnace also being formed with an aperture located substantially at the lowest elevation of the inner surface of said bottom wall and through which scale in liquid state which deposits on said bottom wall can flow out of said furnace.

References Cited by the Examiner

UNITED STATES PATENTS

| | | | |
|---|---|---|---|
| 846,506 | 3/1907 | Parrock et al. | 263—6 |
| 2,100,843 | 11/1937 | Fischer | 263—15 |
| 2,402,013 | 6/1946 | Billeter et al. | 148—16 |
| 2,693,952 | 11/1954 | Nesbitt | 148—16.7 X |
| 2,848,207 | 8/1958 | Rusciano | 263—15 |
| 2,992,147 | 7/1961 | Hayes | 148—16 |

FREDERICK L. MATTESON, JR., *Primary Examiner.*

DAVID L. RECK, CHARLES SUKALO, *Examiners.*

O. MARJAMA, J. J. CAMBY, *Assistant Examiners.*